United States Patent [19]

Grosso et al.

[11] Patent Number: 5,249,343
[45] Date of Patent: Oct. 5, 1993

[54] APPARATUS FOR ALIGNMENT OF WORKPIECES

[75] Inventors: John A. Grosso, Staatsburg, N.Y.; Reena G. Malangone, Charlotte, N.C.; John J. Masten, Jr., Poughkeepsie, N.Y.; Richard M. Schroedl, Wappingers Falls, N.Y.; Robert Stokrocki, Poughkeepsie, N.Y.; Donald G. Will, Poughkeepsie, N.Y.

[73] Assignee: International Business Machines Corporation, Armonk, N.Y.

[21] Appl. No.: 749,033

[22] Filed: Aug. 23, 1991

[51] Int. Cl.$^5$ .................. B25B 27/14; B25B 11/00
[52] U.S. Cl. ................... 29/281.4; 29/281.5; 29/743; 269/21; 269/51
[58] Field of Search .......... 29/466, 468, 559, 271, 29/281.4, 281.5, 743, 738, 758; 269/73, 309, 47, 52, 50, 51, 21

[56] References Cited

U.S. PATENT DOCUMENTS

| | | |
|---|---|---|
| 4,475,458 | 10/1984 | Kennell et al. |
| 4,504,045 | 3/1985 | Kenbo et al. |
| 4,521,114 | 6/1985 | Peski et al. |
| 4,682,928 | 7/1987 | Foulke et al. |
| 4,700,488 | 10/1987 | Curti |
| 4,744,140 | 5/1988 | Bright ........................ 29/271 |
| 4,761,876 | 8/1988 | Kosmowski |
| 4,784,377 | 11/1988 | Woodward |

FOREIGN PATENT DOCUMENTS

| | | | |
|---|---|---|---|
| 166537 | 7/1987 | Japan | 269/21 |
| 9550 | 1/1990 | Japan | 269/21 |

Primary Examiner—P. W. Echols
Assistant Examiner—David P. Bryant
Attorney, Agent, or Firm—Whitham & Marhoefer

[57] ABSTRACT

An apparatus is provided for positioning a workpiece with high accuracy and repeatably positioning the workpiece with similar accuracy while avoiding further manual alignment operations. Tapered pins, movable axially against a spring, are used to support a registration frame above the workpiece and allow attachment of the registration frame to the workpiece with high accuracy after initial manual positioning of the workpiece. After attachment of the registration frame to the workpiece, the use of similar, spring-loaded, tapered pins assures accuracy of positioning without further manual alignment. The axial motion of the pins is particularly advantageous during alignment of a plurality of workpieces in stacks and for processes requiring two-sided registration. During the alignment operation, a vacuum block is relatively movable on a base block and a workpiece immobilized on the vacuum block by a vacuum selectively applied to a portion thereof. When correct alignment has been achieved, the vacuum block is immobilized while the registration frame is attached by selective application of a vacuum to another portion of the vacuum block.

4 Claims, 3 Drawing Sheets

APPARATUS FOR ALIGNMENT OF WORKPIECES

BACKGROUND OF THE INVENTION

1. Field of the Invention

The present invention generally relates to positioning of a workpiece and, more particularly, to a method and apparatus for repetitively positioning a workpiece with high precision.

2. Description of the Prior Art

Many processes require high accuracy of positioning of a workpiece, particularly in connection with a previously determined pattern which controls the operation carried out on the workpiece, for example, exposure of a pattern onto a radiation sensitive material, directly applying a pattern of material, such as stencilling, or virtually any operation involving automation or robotics. Consequently, many sophisticated techniques have been developed for the purpose of achieving accurate positioning with the degree of precision required.

Generally, such techniques involve some optical process and manual alignment, often with the use of a microscope, if warranted by the required accuracy. It is often possible, after coarse manual positioning, to increase the effective accuracy by sensing the location of registration points and calibrating the operation to the detected position of the workpiece.

However, in some manufacturing operations, it is necessary to perform operations on a workpiece on different machines, requiring the workpiece to be precisely aligned with each machine. This is the case with multi-layer ceramic (MLC) or multi-layer module (MLM) structures where a workpiece or "green-sheet" must have a conductive pattern with high feature density applied to it by screening a paste through a stencil. The stencil and resulting pattern must be precisely aligned with perforations in the green sheet which form "vias" for the purpose of creating connections between or through layers of the finished device. After depositing the pattern, other processes requiring a similar degree of positional precision, such as automated testing may be carried out on the separate layers. Finally, the layers must be precisely positioned in a stack for sintering.

It can readily be appreciated that even this final alignment step, alone, requires a manual alignment procedure for each layer of the device in addition to the other alignment steps which may be required for each layer. Therefore, it can be readily understood that the number of alignment procedures which may be required is a major cost factor in the fabrication of MLM and MLC modules and many other types of devices.

This limitation is by no means unique to these types of electronic circuit modules and arrangements for providing registration mechanisms, typically with mating pins and apertures, to eliminate some of the manual alignment steps are known for manufacturing processes for other types of products. However, MLM and MLC modules are representative of types of structures to which such registration mechanisms are not easily applicable. The principal reasons for this difficulty are that MLM and MLC modules are of a relatively expensive material and of high density. The expense of the "footprint" of any known registration arrangement on a lamina of such material would be prohibitive and would also reduce the effective integration density of the completed modules. The small amount of margin space on the workpiece and the fragility of the workpieces limits the ability to attach ancillary structures thereto in a way which will preserve the alignment accuracy available. Further, the accuracy of alignment available from known registration arrangements is not comparable to or compatible with the dimensional resolution of the screening patterns and present a design trade-off between potential degree on miniaturization and the cost of manufacturing devices where manual alignment procedures limit efficiency and manufacturing throughput. Moreover, known registration mechanisms do not readily provide for accommodation of alignment of a large plurality of layers of a layered structure while maintaining alignment accuracy.

SUMMARY OF THE INVENTION

It is therefore an object of the present invention to provide a registration mechanism of increased accuracy.

It is another object of the present invention to provide an alignment arrangement which will allow the avoidance of further alignment procedures during a manufacturing process.

It is a further object of the invention to provide an alignment arrangement which allows the accurate attachment of a plurality of lamina and alignment of each lamina for processing operations to be carried out on either side of the lamina.

It is yet another object of the invention to provide a precision alignment apparatus which does not interfere with the structure of the workpiece and avoids stresses on the workpiece during the alignment process.

To achieve the above and other objects of the invention, there is provided an arrangement for supporting a registration means spaced from a surface including at least two tapered pins, each having an axis concentric with a tapered portion of each said tapered pin, and arranged for movement only along said axis, and a means for urging said tapered pins in a direction along said axis such that said tapered portion is displaced from a plane including said surface.

In accordance with another aspect of the invention, an arrangement for aligning a workpiece is provided with a registration means including means for supporting a registration means spaced from a surface including at least two spaced apart tapered pins, each having an axis concentric with a tapered portion of each said tapered pin, and arranged for movement only along said axis, a means for urging said tapered pins in a direction along said axis such that said tapered portion is displaced from a plane including said surface, and means for positioning said workpiece at a desired location in said plane.

In accordance with a further aspect of the invention, a process is provided including the steps of placing a workpiece on a support, supporting a registration means above said workpiece on at least two tapered pins engaging features on said registration means, said tapered pins being movable in an axial direction, positioning said workpiece, and bringing said registration means into contact with said workpiece.

In accordance with yet another aspect of the invention, an apparatus is provided including a base plate having a bearing surface, a further plate relatively movable over said bearing surface of said base plate and in contact therewith, means for holding a workpiece in a predetermined location on said further plate and means for immobilizing said further plate on said base plate.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
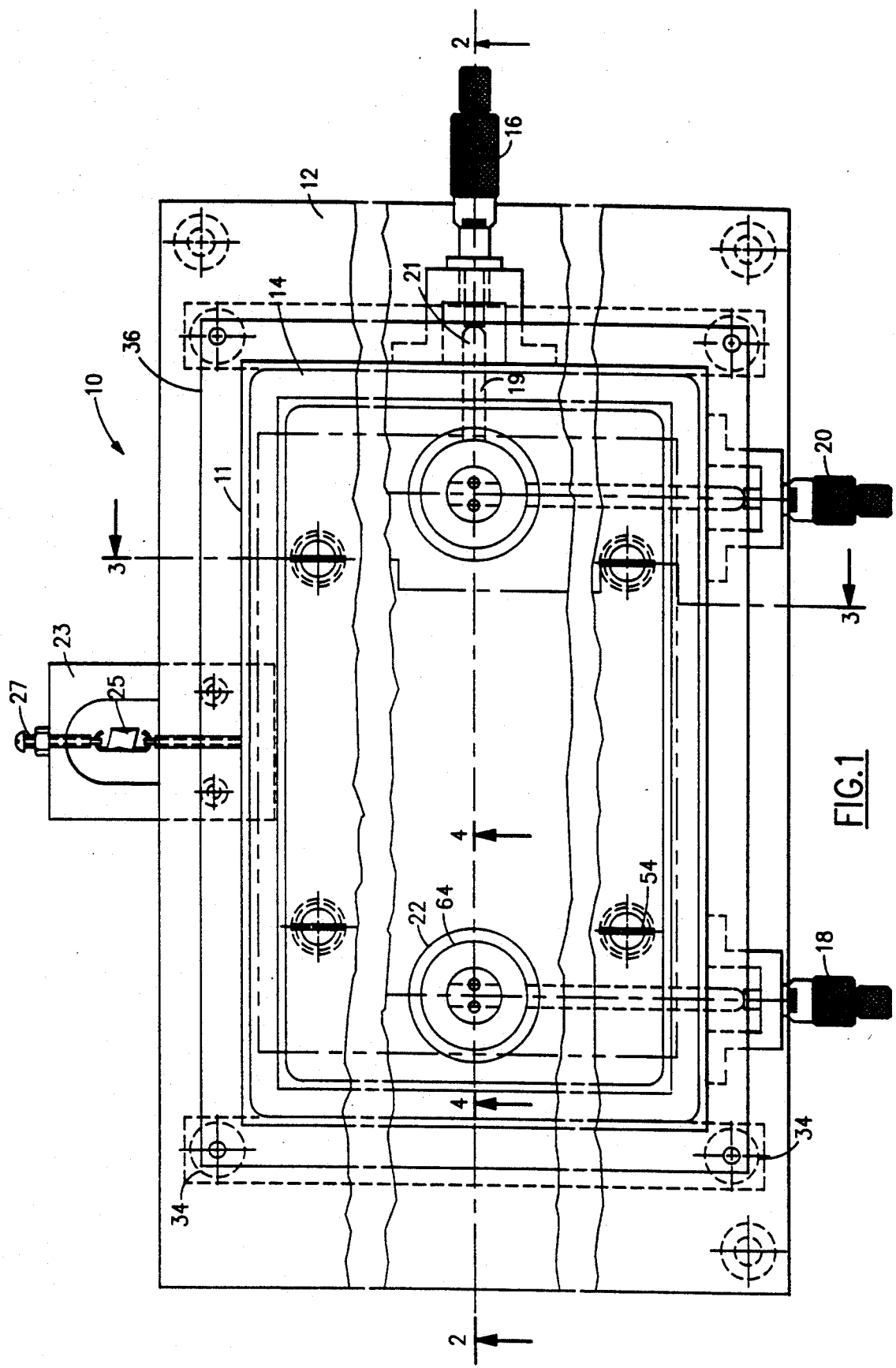
FIG. 1 is a plan view of the invention.

Referring now to the drawings, and more particularly to FIG. 1, there is shown a plan view of the structure 10 of the invention. A base block is provided for rigid and preferably stress relieved attachment to a support structure such as a light table 32, shown in FIG. 2. The light table provides illumination which will facilitate alignment through the use of optical devices such as a split-image microscope. Such optical techniques, while considered preferable, are not necessary to the practice of the invention and will not be discussed further.

Slidably attached to the base block 12 by springs 52, discussed below, is a vacuum block or plate 14 with raised edges on the top and bottom preferably forming concave channels 15 about the periphery thereof. The channel on the top holds the workpiece 11, such as an artwork glass or green sheet when vacuum is selectively applied within the upper channel. The raised edges on the bottom of the vacuum block bear against a Teflon TM bearing 19 formed on the base block 12 and planarized with the surface thereof. When vacuum is selectively applied to this lower channel of the vacuum block, the vacuum block is held stationary on the base block. It should be noted that it is desirable to confine the vacuum to a narrow channel at the edge of the vacuum plate to avoid distortion of the artwork glass 11 and to avoid the need for centrally located supports therefor, which could damage wiring patterns on its surface. Also, since openings 22 are centrally formed in the vacuum block 14, confinement of the vacuum to channels 15 in the periphery of the vacuum block allows selectivity in immobilizing both the workpiece 11 relative to the vacuum block 14 and the vacuum block 14 relative to the base block 12. While passages for communicating the vacuum to each of the channels is not shown in the drawings, it is deemed preferable to attach vacuum lines to the edge of the vacuum block with conventional hardware.

The base block is fitted with hollow, upstanding studs 17 which are preferably tightly fitted in holes in the base plate 12 (to facilitate planarization of the base block). It is preferable that these structures, whether formed integrally with the base plate or fitted therein be hollow to allow illumination of a target placed or formed on an upper surface thereof, as will be discussed in greater detail below with reference to FIG. 4. The portion of studs 17 which rises above the planarized surface of the base block provides for relative positioning of the base block and the vacuum block by means of three micrometer adjustments. A bearing surface for the micrometer adjustments is preferably achieved by placing a ball bearing 64 around the protruding portion of each of studs 17. The use of a rotatable bearing avoids the formation of flat surfaces where the micrometers exert a positioning force. While other types of bearings could be used, such as hardened steel sleeve bearings, a ball bearing is preferred since it can be easily preloaded (e.g. by press fitting on stud 17 to avoid lost motion in the positioning linkage. It should also be noted that passages 19 are formed in the edges of vacuum block 19 to provide for locating of pins 21 radially of the bearing which convey force from the micrometer adjustments to the bearing. These pins 21 are preferably of greater radius than the maximum positioning of the vacuum table which will be required which is reflected in the clearance between the bearing 64 and the internal diameter of opening 22 in vacuum plate 14. Thus, as positional adjustments are made, the outer diameter of bearings 64 will smoothly roll across the surface of pins 21.

The positioning of the vacuum block 14 relatively to the base block is achieved through three micrometers which control the sliding therebetween. One micrometer adjustment 16 is provided for positional adjustment in the X (e.g. left/right) direction while two additional micrometer adjustments 18, 20 are provided to achieve both adjustment in the Y direction (e.g. toward/away from an operator) and angular positioning of the workpiece. The micrometers are attached to the outer periphery of vacuum block 14 and exert a compressional force against the studs 17 through pins 21 and bearing 64. Lost motion in this linkage is avoided by the use of a tension spring 25 which applies a force between the base block and the vacuum block by means of yoke 23, attached to base block 12. Adjustment is provided by a screw 27, attached to spring 25. The use of a spring to provide preloading against the micrometers allows for substantially constant preloading through all motion of the vacuum block. While a similar yoke and spring could be used for similar preloading in the X direction against micrometer 16, neither such an additional yoke and spring nor offsetting of spring 25 has been found necessary, in practice.

Figure 2:
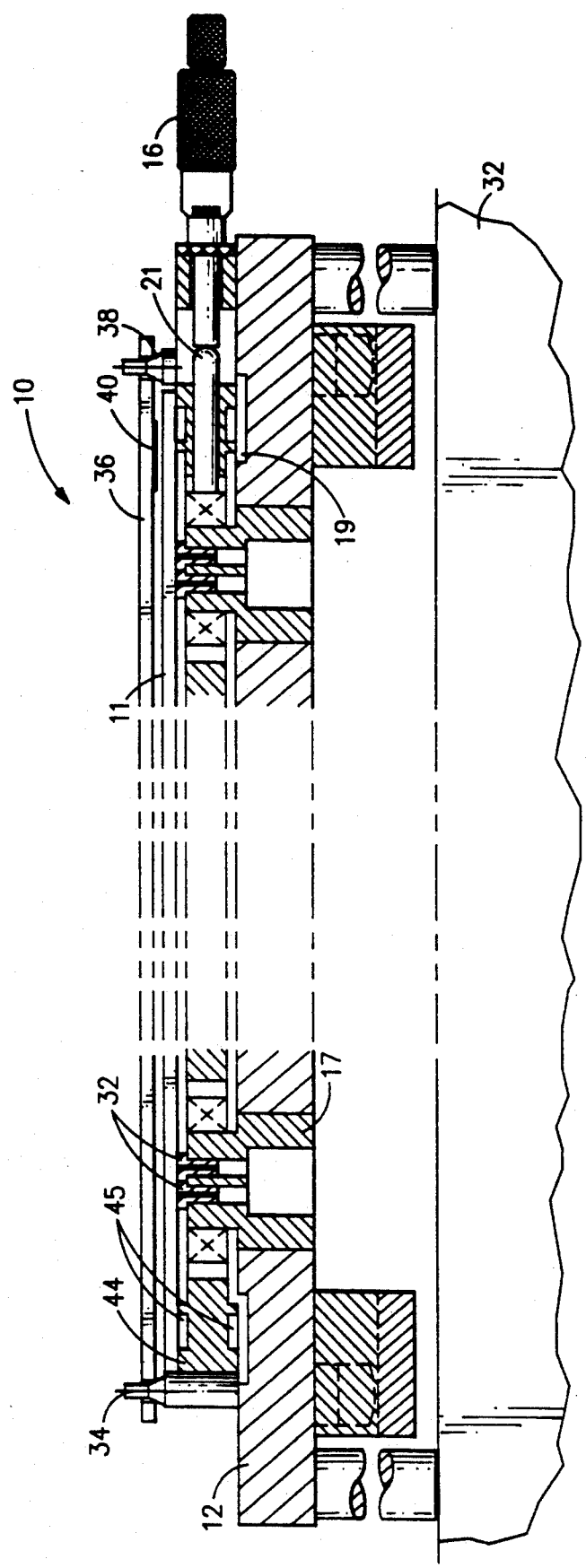
FIG. 2 is a sectional view of the invention taken along section line A—A of FIG. 1.
Figure 3:
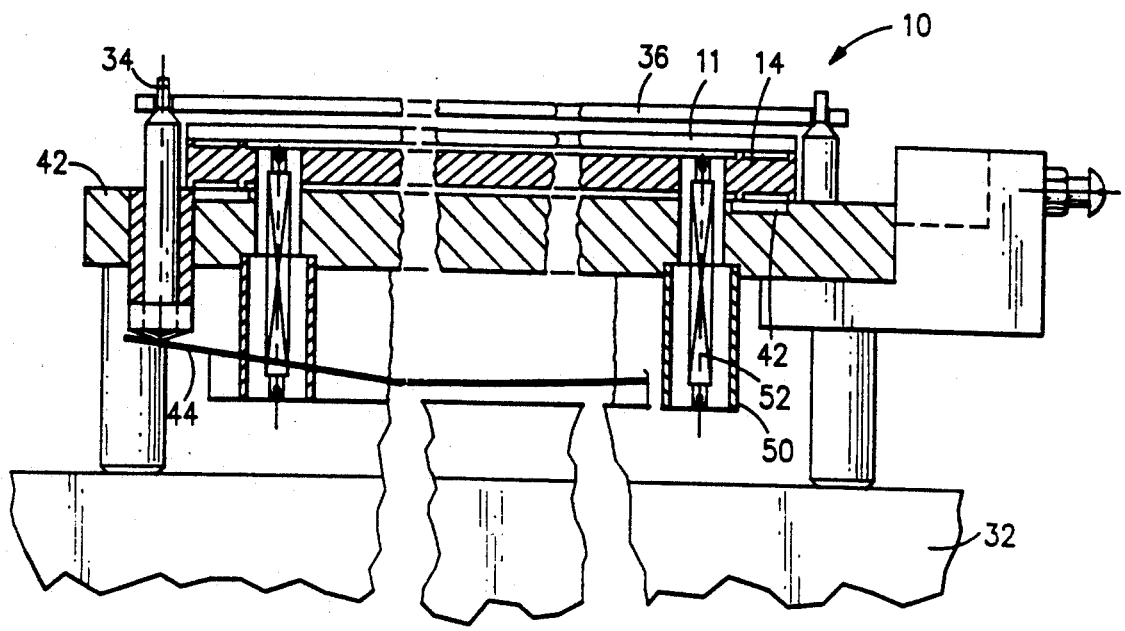
FIG. 3 is a sectional view of the invention taken along section line B—B of FIG. 1.

Referring now to FIGS. 2 and 3, a particularly important feature of the invention is clearly illustrated. In order to provide accurate and repeatable alignment of the workpiece for operations on a plurality of machines or for a plurality of sequential processing steps, in accordance with the invention, a plurality of at least two, but preferably four, spring loaded, tapered registration pins 34 are provided for engagement with features, such as holes, in a registration frame 36. The taper of the registration pins provides for unambiguous alignment with the registration frame 36 regardless of variations in the diameter of holes 38 in the registration frame caused either during manufacture or wear, in use. The taper of the pins is not critical to the practice of the invention but an angle of between 20° and 35° is deemed preferable to avoid jamming while providing good positioning force from the weight of the registration frame when placed thereon. Therefore, when the registration frame is placed on a tapered pin, the center or axis of the tapered pin will always be coincident with the center of the hole in the registration frame. The taper of the registration pins in combination with the spring support of the tapered pins also provides for support of the registration frame above the workpiece during positioning of the workpiece. Preferably, the pins will be dimensioned and leaf springs 44 adjusted that the registration frame will be supported above the workpiece at a separation of about 0.030 inches to minimize lateral movement through any angular movement of the registration frame as it is pressed against the workpiece (e.g. if one edge or corner of the registration frame is pressed against the workpiece before the opposite edge or corner).

In use, the workpiece 11 is attached to the vacuum block 14 and immobilized with respect to the vacuum block by a vacuum applied to the upper channel 10 thereof. A registration frame 36 with double sided tape 40 on the lower side thereof is positioned on the tapered, spring-loaded pins and supported above the workpiece by a very small distance. Therefore, it can be understood that the registration frame is held in a fixed and predetermined position while the workpiece is positioned relative to the registration frame. After the workpiece is correctly positioned, the vacuum block is immobilized with respect to the base block 12 (which carries the tapered registration pins and thus serves to precisely locate the registration frame) and a small pressure on the registration frame, exerted by the operator, can bring the registration frame into contact with the workpiece. The workpiece and the registration frame are thus adhered together by the double-sided tape until separation at a later stage of the manufacturing process. Thereafter, in subsequent manufacturing steps, possibly on different machines, the correct positioning of the workpiece is achieved to a tolerance of about 10 microns, or about an order of magnitude greater accuracy than could be achieved in previous arrangements. Of equal or greater importance, the accuracy of alignment is maintained for other machines and processes where similar arrangements of tapered, spring loaded registration pins are utilized.

More specifically, the taper of the registration pins allows unambiguous positioning of the frame and the inclusion of such structures on each machine used for processing the workpiece will assume equally accurate positioning of the frame thereon. Since the workpiece has been accurately positioned at the time of attachment to the frame, the accuracy of positioning of the workpiece will be maintained without further manual alignment procedures. The spring loading of the tapered pins, preferably by leaf spring 44, allows for vertical movement of the frame and workpiece during such processing steps and compensates for differences in vertical location of the frame and workpiece due to variations in the size of holes 38 in the frame.

Similarly, the axial movement of the tapered registration pins compensates for any offset between the plane of the workpiece surface and the plane of either surface of the registration frame. Therefore, the arrangement according to the invention is particularly useful when operations must be carried out on either surface of the workpiece, such as in the fabrication of double sided circuit boards, or other processes which require two-sided registration at high accuracy.

It should be understood that the use of a double-sided tape for attachment of the registration frame to the workpiece is preferred but many other arrangements for providing adhesion between a workpiece and a structure for providing registration would be suitable, in accordance with the invention. By the same token, since a minimum of two tapered, spring loaded registration pins would be sufficient to establish unambiguous alignment of the workpiece, other arrangements could be used to provide additional support of the workpiece or registration frame. It should also be understood that the location of the pins relative to the workpiece can be arranged at will, in accordance with the invention. Also, since the registration means, while preferably in the form of a frame for providing additional support to fragile workpieces, can be of any desired shape or size and need not comprise a frame or overly more than a small portion of the periphery of the workpiece.

As perfecting features of the invention, as best shown in FIG. 3, spring loaded connections 50 are provided to allow the vacuum block 14 to slidably engage the planarized surface of the base block. The vacuum block 14 is retained in connection with the base block 12 preferably by a coil spring 52 installed coaxially within the connection 50 and attached, at an upper end, to a cross-bar 54 provided across an opening in the vacuum block 14. Connection 50 contains a similar cross-bar and is attached to or merely compressed against the base block by the tension in spring 52. Preferably four of these spring loaded connections are provided to distribute the positioning load over the base block and the vacuum block to avoid distortion of either.

Figure 4:
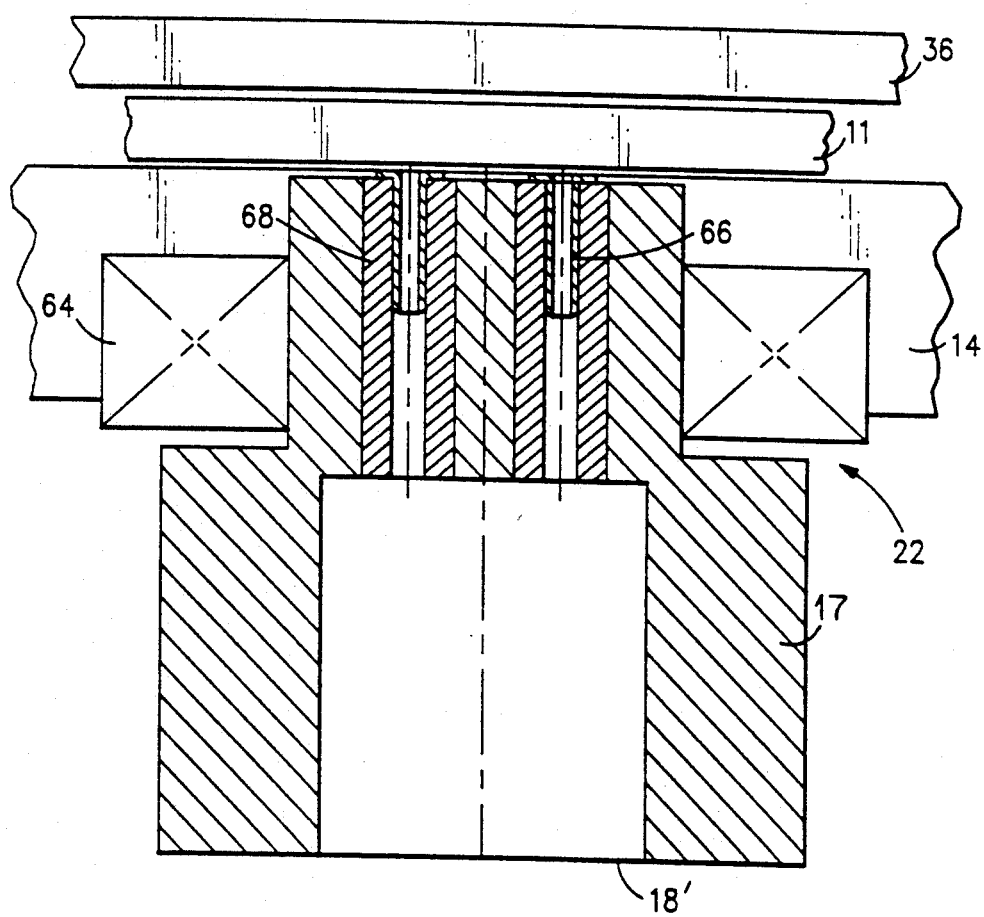
FIG. 4 is a detail view of a portion of the invention taken along section line A—A of FIG. 1.

Referring now to FIG. 4, an enlarged sectional view of a portion of the structure of the invention is shown at a cross-section of one of the hollow studs 17. Bearing 64 is shown fitted against a portion of stud 17 which protrudes above the planarized surface of base block 12. Two fixed bushings 68 are fitted in holes formed in the upper portion of stud 17, as shown. These holes are preferably through-holes communicating with the hollow portion 18' of stud 17 to allow for illumination of targets from below.

Alignment targets are formed by bushings 66 which are slidably positioned within fixed bushings 68. These removable bushings 66 will preferably have an aperture of accurate internal dimension formed therein to serve as an optical target for positioning of the workpiece. It is to be understood that since these bushings are removable and replaceable, other targets of differing shape and size from the preferable form described below can be readily substituted. Preferably, these bushings are somewhat elongated, as shown in FIG. 4, to provide some collimation of light passing therethrough and, thus, reveal any angular orientation of the optical system used for alignment which could otherwise introduce a parallax error into the system. In practice, at the present time, an internal diameter of bushings 66 is preferably 0.036 inches. The workpiece will also have an optical target formed thereon which will include two opaque disks of 0.035 inches diameter and the same center-to-center spacing as the bushings 68. When the workpiece is properly aligned, the operator will see two annuli of equal and even width, assuring both orthogonal and angular alignment of the workpiece by optical symmetry in both axes. Since, if perfectly aligned, the width of the annulus would be 0.0005 inches, it is clear that a misalignment of far smaller dimension would be readily apparent to the operator. For example, an error of alignment of only 0.00005 inches would result in a variation of width of the annuli of 20%, which is very readily visible. In practice, it has been found that alignment accuracy of approximately 10 microns can be easily and rapidly achieved for attachment to the registration frame and this degree of accuracy can then be maintained throughout a large plurality of processing steps without the need for further manual alignment of the workpiece.

In view of the above, it is seen that an arrangement has been provided which provides for the improvement and maintaining of alignment accuracy through a plurality of manufacturing processes while avoiding the need for additional manual alignment procedures during such plurality of processes, which is applicable to the attachment of a plurality of lamina and which does not obstruct access to the surface of the workpiece.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. An apparatus including
   a base plate having a bearing surface,
   a further plate relatively movable over said bearing surface of said base plate and in contact therewith,
   means for holding a workpiece in a predetermined location on said further plate and
   means for immobilizing said further plate on said base plate
   at least two tapered pins, each having an axis concentric with a tapered portion of each said tapered pin, and arranged for movement only along said axis, and
   a means for urging said tapered pins in a direction along said axis such that said tapered portion is displaced from a plane including said surface.

2. An apparatus as recited in claim 1, wherein said means for holding a workpiece comprises a concave portion for contacting said workpiece, to which a vacuum can be selectively applied.

3. An apparatus as recited in claim 1, wherein said means for immobilizing said further plate on said base plate comprises a concave portion for contacting said base plate, to which a vacuum can be selectively applied.

4. An apparatus as recited in claim 2, wherein said means for immobilizing said further plate on said base plate comprises a concave portion for contacting said base plate, to which a vacuum can be selectively applied.

* * * * *